United States Patent [19]

Holtkamp, Sr.

[11] Patent Number: 4,932,159

[45] Date of Patent: Jun. 12, 1990

[54] WICK INSERTION DEVICE FOR A PLANT POT

[76] Inventor: Reinhold Holtkamp, Sr., Werther Strasse 112, D-4294 Isselburg, Fed. Rep. of Germany

[21] Appl. No.: 418,216

[22] Filed: Oct. 6, 1989

[51] Int. Cl.$^5$ ............................................. A01G 27/00
[52] U.S. Cl. ....................................................... 47/81
[58] Field of Search ........................... 47/79, 81, 59, 62

[56] References Cited

U.S. PATENT DOCUMENTS

| 3,557,490 | 1/1971 | Delaney | 47/81 |
| 4,117,632 | 10/1978 | Pearce | 47/81 |
| 4,389,815 | 6/1983 | Pearce | 47/81 |

FOREIGN PATENT DOCUMENTS 183168 of 1906 Fed. Rep. of Germany .......... 47/81

*Primary Examiner*—David A. Scherbel
*Assistant Examiner*—Jerrold D. Johnson
*Attorney, Agent, or Firm*—Foley & Lardner, Schwartz, Jeffery, Schwaab, Mack, Blumenthal & Evans

[57] ABSTRACT

A self-locking wick insertion device for a pot to permit bottom watering of a potted plant by capillary action, the device including a base, a generally centrally positioned upwardly extending stem, and circumferentially spaced, radially extending ribs formed on the stem. A groove is formed in the top of the stem for snugly receiving the wick, with a slot being formed in the base through which the wick can extend into the water supply. The ribs are inserted into an opening in the bottom of the pot, with the radial dimension of the ribs being such that the ribs are slightly radially compressed during such insertion to provide firm frictional engagement of the ribs with the wall defining the opening. The wick is maintained within the growing media for the plant, and water from the water supply can be transmitted by capillary action through the wick to the growing media.

6 Claims, 1 Drawing Sheet

WICK INSERTION DEVICE FOR A PLANT POT

BACKGROUND OF THE INVENTION

The present invention relates as indicated to a wick insertion device for a plant pot, and relates more particularly to a device which is adapted to carry a water-transmitting wick and which can be locked in position in an opening formed in the bottom wall of the pot, thereby to permit water to be transported to the growing medium and the plant in the pot by capillary action.

In applicant's co-pending application Serial No. 281,622, incorporated herein by reference, there is disclosed a watering container specifically adapted for miniaturized plants, particularly African violets. The container, which will be described in somewhat more detail below, is constructed to receive a miniaturized pot in the upper wall thereof, with the bottom wall of the pot preferably terminating slightly above the water in the container. The term "water" is used herein to include water obtained from a normal water supply or source, and water to which fertilizer and/or other nutrients and growth regulators and enhancers have been added.

In the container assembly described in my co-pending application a water-transmitting wick extends upwardly into the growing media of the pot through a hole in the bottom of the pot, and is suspended at its lower end in the water. The wick is made of any well known material for transmitting water by capillary action, and is sized so as to transmit the desired amounts of water to the growing medium. In this manner, the water need be replenished only periodically, and the bottom watering of the plant provides a continuous supply of water in the proper amounts. Top watering of African violets is undesirable for many reasons well known to those in the art, and in addition presents particularly difficult problems where the pots are miniaturized.

Although the plant watering container disclosed in my pending application has proved highly satisfactory in use and has achieved widespread acceptance in the horticultural industry, some difficulties have been encountered in inserting the wick into the pot, particularly when the pot has been filled with growing media prior to wick positioning. Even when the wick is positioned prior to the placement of growing media in the pot, means must be taken to insure that the wick remains in place in the pot when the pot is filled.

SUMMARY OF THE INVENTION

Various means and methods have been utilized to insert the wick into the pot through the opening in the bottom wall thereof, none with particular success prior to the present invention. The present invention solves this problem simply and inexpensively. In accordance with the invention, a wick insertion device is employed which includes a base member adapted to engage the outer surface of the bottom wall of the pot, a stem extending upwardly through the hole in the bottom of the pot, ribs extending radially from the stem, and a groove formed in the top of the stem. The base is formed with a radial slot, with the groove and slot being of a width to relatively snugly receive the wick. The ribs are resilient and when undeformed define at their radially outer edges a circle slightly larger in dimension than the diameter of the hole in the bottom of the pot. To lock the device in place, the stem and ribs are moved upwardly through the hole in the bottom wall of the plant, with the wick being positioned in the groove and slot as described, and during such movement the radial outer surfaces of the ribs engage the wall defining the opening in the bottom wall of the pot. The resiliency of the ribs permits slight radially inward deformation thereof so that the ribs tightly frictionally engage the wall of the opening so as to retain the device in place. The upper end of the wick carried in the groove can thus be embedded in the growing media, with the bottom end of the wick extending through the opening in the bottom wall of the pot and downwardly into the water supply for delivering water by capillary action to the growing media and plant. The base, stem, and ribs are preferably integrally formed of a suitable relatively firm plastic material having the desired degree of resiliency, and the device can be molded very inexpensively.

In order to prevent radially outward movement of the wick in the groove, the opposed walls defining the slot are formed with opposed, inwardly directly lugs or projections which define therebetween a gap. The projections are dimensioned so as to require compression of the wick cross-section as it is pulled through the gap toward the center. The wick is thus confined to the slot opening between the projections and the center, thus effecting a natural vertical suspension of the wick when it is immersed in the water.

If it is desired for any reason to remove the wick, the base can be grasped and moved downwardly away from the bottom wall of the pot to entirely remove the device from the interior of the pot. The device is therefore readily adaptable to plants other than African violets wherein watering requirements differ. The wick material and dimensions can be selected to provide the desired water transmitting capability.

Other objects and features of the invention will become apparent as the following description proceeds in particular reference to the application drawing.

DETAILED DESCRIPTION OF THE PREFERRED EMBODIMENTS

Figure 1:
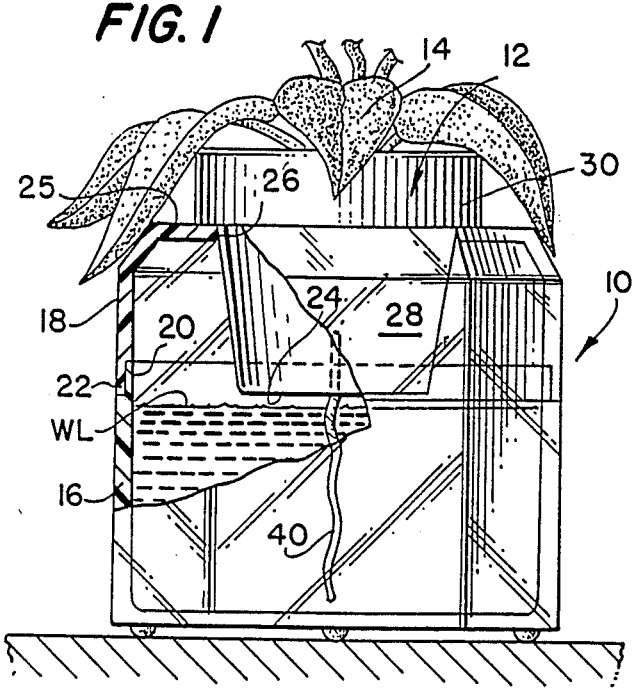
FIG. 1 illustrates the plant watering container in accordance with the invention disclosed in my pending application.

FIG. 1 illustrates the plant watering container disclosed in my pending application referred to above, and is included for the purpose of providing a better understanding of the need for and significance of the present invention. Briefly described, the container assembly is generally indicated at 10, and is adapted to receive and support a pot generally indicated at 12 containing a plant 14 and growing media therefor, in the usual fashion. The pot is miniaturized, being shown in FIG. 1 actually larger than its true size of approximately 1.5 inches in diameter. However, the container could be enlarged to receive pots of larger, or even smaller, diameter.

The container 10 includes a lower section 16 and an upper section 18 each having a flange 22 and 20, respectively, to snugly mount the upper section on the lower section.

The pot 12 typically includes a bottom wall 24 having a main central opening, a lower tapered section 28, and an upper diametrically enlarged section 3D, with the latter resting on the top surface of the top wall 25 of the upper section 18 of the container. The upper wall is formed with a bevelled opening 26 to receive the pot, with the bevel angle being approximately complementary to the angularity of the lower section 28 of the pot thereby to increase the surface contact between the pot and the container and stabilize the pot when positioned in the container.

The water level WL is preferably kept below the bottom 24 of the pot as shown in FIG. 1, and a wick 40 extends from the growing media downwardly into the water. Water is thereby transmitted by capillary action to the growing media for bottom watering of the plant which, in the case of African violets, is greatly preferred.

The system illustrated in FIG. 1 has performed very well as long as the wick remains in the position shown, although some difficulties have been encountered in inserting the wick through the bottom opening in the pot. The wick can be made from any suitable material providing the necessary capillary action, for example, cotton, wool, synthetic fabrics, or combinations of these, is relatively small in diameter, and droops without support of some kind. As a result, various means such as small tools have been used, all without complete success, to insert the wick into the pot as shown in FIG. 1.

Figure 3:
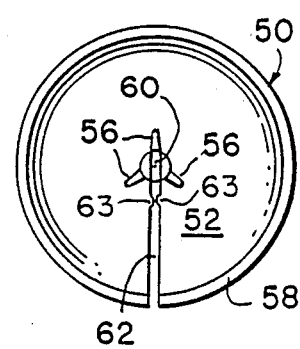
FIG. 3 is a top plan view of the device of FIG. 2.
Figure 2:
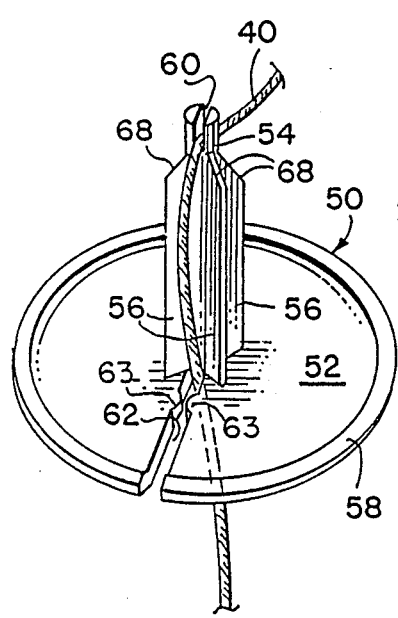
FIG. 2 is a perspective view of the wick insertion device of the present invention, shown greatly enlarged.
Figure 4:
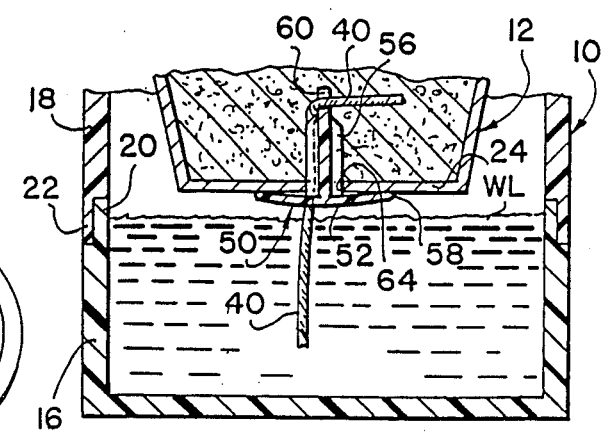
FIG. 4 is a fragmentary vertical sectional view showing the device fully inserted in the bottom wall of the pot.

The present invention provides both a means for quickly and easily inserting the wick in the pot, and maintaining the wick in position in the pot. Referring to FIGS. 2-4, the wick insertion device comprising the present invention is generally indicated at 50 and includes a base 52, a generally centrally positioned stem 54 extending upwardly from the base, and ribs 56 extending radially from the stem. In the form shown, three ribs are provided, although more or fewer could be used as well. The ribs are circumferentially spaced around the stem, as shown in FIG. 3. The base 52 is slightly convex, as shown in FIG. 4, and the periphery is thickened to form a shoulder 58 to rigidify the base and improve contact with the bottom wall of the pot.

A groove 60 is formed in the upper surface of the stem to receive the wick 40, with the dimension of the groove being slightly less than the diameter of the wick. The wick when inserted through the groove is therefore slightly compressed so as to snugly maintain the wick in position in the groove.

The base is formed with a radial slot 62 extending from the stem entirely to and through the periphery of the base. The opposite end of the wick extends downwardly through the radial slot 62 and central opening 64 formed in the bottom wall of the pot so as to hang below the device 50 and extend into the water. The slot 60 is shown in FIG. 3 as extending in a direction between ribs 56, although this is not necessary in view of the size and flexibility of the wick. When the wick is positioned in the slot as shown in FIGS. 2 and 4, and the device inserted through the central opening 64 (See FIG. 4) in the bottom wall 24 of the pot 12, the wick will be disposed within the radially outer confines of adjacent ribs 56.

The ribs 56 are preferably integrally formed with the stem 54, which is in turn preferably integrally formed with the base 52. All of the described components can be molded from a suitable plastic material simply and inexpensively. The material selected should be semi-rigid so as to remain firmly in place when in use, but sufficiently resilient to permit radial inward deformation of the ribs 56 when the device is installed. In this regard, the radially outer edges of the ribs 56 define a circle the maximum diameter of which is slightly greater than the diameter of the opening 64 formed in the bottom wall 24 of the pot. As can be seen in FIG. 2, the top surface of each rib is bevelled as shown at 68 so as to provide a plurality of cam surfaces when the device is inserted in the opening. The dimensional relationship is such that the device can be inserted upwardly through the opening 64 in the pot with minimal force, with the radially outer edges of the ribs being slightly resiliently compressed to provide a snug fit of the device in the opening. When the device is extended fully upwardly, the shoulder 58 engages the bottom surface of the bottom wall 24 of the pot.

The slot 62 extends to the stem 54, and as above noted the downwardly extending wick is accommodated in the slot within the confines of the circle defining the outer edges of the ribs 56. Thus, when the wick is installed as shown in FIG. 2, it does not in any way interfere with the insertion of the device in the opening, with the wick extending freely through the opening. In order to prevent the wick from moving radially outwardly in the slot when the pot is positioned in the filled container, the opposed walls of the base which define the slot are formed with opposed lugs or projections commonly designated at 63. The ends of the projections are spaced so as to form a gap through which the wick can be drawn inwardly past the projections and accommodated in the region of the slot 62 between the projections and the base. The wick, without outward pressure being exerted, is confined in such position when the wick is immersed thereby preventing radially outer movement of the wick in the slot which could prevent or impair immersion of the wick.

Although the upper end of the wick 40 is shown both in FIGS. 2 and 4 as extending only slightly beyond its engagement in the groove 60, it can be of any desired length. In fact, the upper end can be drawn downwardly adjacent to the stem between opposite ribs, then radially outwardly along the top surface of the base 52, and downwardly into the water when the device is mounted. The diameter and flexibility of the wick does not when so arranged interfere whatsoever with the insertion of the device. The advantage of the latter arrangement is that capillary action can be achieved with both ends of the wick, at the sacrifice, however, of the wick having only limited contact with the growing media immediately around the stem of the device.

The use of the invention will be apparent from the foregoing description. The wick and device 50 can be preinstalled in the pot prior to filling, or can be inserted after filling. A supply of pots, devices, and wick material can also be supplied separately to the grower for insertion of the device at the desired point in the production cycle. The device is frictionally retained in place but can be easily removed simply by inserting a finger or tool between the ridge 58 and the bottom wall of the pot and pulling the device downwardly to a point where it can be fully grasped. If a wick is to be replaced or a wick of a different size or material is to be used, the wicks can be quickly and easily interchanged, and the device reinserted.

What is claimed is:

1. A self-locking insertion device for a water-transmitting wick for a potted plant wherein the plant is adapted to be watered from the bottom by said wick through capillary action from a water supply, the pot having a bottom wall in which is formed an opening, said device comprising:

(a) a base adapted to engage the bottom surface of the bottom wall of said pot when said device is locked in position;

(b) an elongated stem extending upwardly from said base and adapted to extend upwardly into said pot;

(c) a plurality of elongated resilient ribs extending radially from said stem in circumferentially spaced relation, the radially outer surfaces of said ribs being slightly greater in maximum dimension than the dimension of said opening in said pot;

(d) a groove formed in the top of said stem adapted to receive the water-transmitting wick; and (e) a radial slot formed in said base through which said wick can extend downwardly through the hole in the bottom of said pot for immersion in water, whereby said device with said wick positioned in said groove and said slot is adapted to be frictionally retained in said opening in the bottom wall of said pot by virtue of the frictional engagement of said resilient ribs with the wall of said opening, said wick thereby being embedded in said growing media and transmitting water thereto by capillary action.

2. The device of claim 1 wherein said base is convexly shaped, tending to flatten when said device is locked in place thereby to engage the bottom surface of the wall of said pot over a greater surface area to increase the locking effect.

3. The device of claim 1 wherein said ribs terminate at their upper ends below the top of said stem formed with said groove, and are formed with bevelled surfaces at said upper ends to provide cam surfaces to facilitate insertion of said device through said opening.

4. The device of claim 1 wherein said base, stem, and ribs are integrally formed of plastic material.

5. The device of claim 1, wherein said slot is defined by opposed walls of the base, and further including opposed projections formed on said walls and extending into said slot, the projections being spaced from each other a distance less than the uncompressed diameter of said wick to form a narrow gap, whereby said wick, under radially inwardly directed pressure, can be forced through said gap to a region of said slot inwardly of said gap, said wick when released being unable to move radially outwardly through said gap.

6. The device of claim 5 wherein said projections are formed relatively adjacent said stem.

* * * * *